US009796432B2

(12) United States Patent
Stauter

(10) Patent No.: US 9,796,432 B2
(45) Date of Patent: Oct. 24, 2017

(54) HEAT DEFLECTOR FOR TRACTOR-TRAILER REFRIGERATION SYSTEM

(71) Applicant: Carrier Corporation, Farmington, CT (US)

(72) Inventor: Richie C. Stauter, Fayetteville, NY (US)

(73) Assignee: CARRIER CORPORATION, Farmington, CT (US)

(*) Notice: Subject to any disclaimer, the term of this patent is extended or adjusted under 35 U.S.C. 154(b) by 0 days.

(21) Appl. No.: 15/073,976

(22) Filed: Mar. 18, 2016

(65) Prior Publication Data

US 2016/0272256 A1 Sep. 22, 2016

Related U.S. Application Data

(60) Provisional application No. 62/135,777, filed on Mar. 20, 2015.

(51) Int. Cl.

| | |
|---|---|
| ***B60K 13/04*** | (2006.01) |
| ***B62D 35/00*** | (2006.01) |
| ***B60P 3/20*** | (2006.01) |
| ***B60H 1/00*** | (2006.01) |
| ***B60H 1/32*** | (2006.01) |
| ***F25B 39/00*** | (2006.01) |
| *F25B 39/04* | (2006.01) |

(52) U.S. Cl.

CPC ....... *B62D 35/001* (2013.01); *B60H 1/00378* (2013.01); *B60H 1/3227* (2013.01); *B60H 1/3229* (2013.01); *B60P 3/20* (2013.01); *F25B 39/00* (2013.01); *F25B 39/04* (2013.01); *F25B 2339/04* (2013.01)

(58) Field of Classification Search

CPC ..... B60K 13/04; B62D 35/001; F01N 13/082; F01N 2590/08

See application file for complete search history.

(56) References Cited

U.S. PATENT DOCUMENTS 3,697,120 A 10/1972 Saunders
3,797,879 A * 3/1974 Edwards ............. B62D 35/001 105/1.1

(Continued)

FOREIGN PATENT DOCUMENTS

CA 2080386 A1 4/1994
EP 2108544 A1 10/2009

(Continued)

OTHER PUBLICATIONS

International Search Report for application PCT/IB2015/000530 dated Nov. 26, 2015, 6 pages.

(Continued)

*Primary Examiner* — Bryan Evans
(74) *Attorney, Agent, or Firm* — Cantor Colburn LLP

(57) ABSTRACT

A transport refrigeration system is provided including a tractor vehicle having an engine and a trailer operably coupled to the tractor vehicle. A transport refrigeration unit is mounted to a front surface of the trailer adjacent the tractor vehicle. At least one shield is mounted to the tractor or the trailer and is configured to divert discharged hot air from a flow path towards a condenser air inlet of the transport refrigeration unit.

14 Claims, 2 Drawing Sheets

20 40 28 22 32 26 30 24 36 34 38

(56) References Cited

U.S. PATENT DOCUMENTS 3,878,914 A 4/1975 Gulich et al.
3,929,202 A 12/1975 Hobbensiefken
3,934,923 A * 1/1976 Lissaman ............. B62D 35/001 105/1.2
4,143,731 A * 3/1979 Haustein ............... F01N 13/082 180/89.2
4,210,354 A 7/1980 Canning
4,585,262 A 4/1986 Parks
4,595,207 A 6/1986 Popp
4,781,388 A 11/1988 Wohrl et al.
5,318,309 A 6/1994 Tseng et al.
5,332,280 A 7/1994 DuPont et al.
5,752,805 A 5/1998 Gail et al.
6,585,312 B2 7/2003 Jain
6,805,356 B2 10/2004 Inoue
6,923,783 B2 8/2005 Pasqualucci
7,073,845 B2 7/2006 Ortega et al.
7,216,923 B2 5/2007 Wong et al.
7,789,412 B2 9/2010 Alguera
7,950,720 B2 5/2011 Skopic
8,807,628 B1 * 8/2014 Pfaff .................... B62D 35/001 296/180.1
8,857,893 B2 10/2014 Reiman et al.
8,911,206 B2 12/2014 Campbell et al.
8,960,769 B2 * 2/2015 He ....................... B62D 35/001 296/180.2
2006/0055118 A1 3/2006 Beichl
2007/0132190 A1 6/2007 Trabert
2008/0217957 A1 9/2008 Schoon
2008/0309017 A1 12/2008 Mattice
2009/0025994 A1 1/2009 Kakishita
2010/0218531 A1 * 9/2010 Khan ................. B60H 1/00014 62/259.1
2010/0242462 A1 * 9/2010 Smith ................... F01N 13/082 60/324
2013/0088039 A1 * 4/2013 Feight .................. B62D 35/001 296/180.2
2014/0232133 A1 8/2014 He et al.

FOREIGN PATENT DOCUMENTS

GB 439367 A 12/1935
WO 2014047615 A1 3/2014
WO 2014106264 A1 7/2014
WO 2016151351 A1 9/2016

OTHER PUBLICATIONS

Written Opinion for application PCT/IB2015/000530 dated Nov. 26, 2015, 4 pages.

European Search Report for application EP 16161279.1, dated Nov. 9, 2016, 7 pages.

* cited by examiner

HEAT DEFLECTOR FOR TRACTOR-TRAILER REFRIGERATION SYSTEM

CROSS-REFERENCE TO RELATED APPLICATIONS

This application claims the benefit of U.S. provisional patent application Ser. No. 62/135,777, filed Mar. 20, 2015, the entire contents of which are incorporated herein by reference.

BACKGROUND

This invention relates generally to transport refrigeration systems, and more particularly, to heat shields arranged between the tractor and the trailer of a transport refrigeration system.

Refrigerated trucks, trailers, and intermodal containers, collectively mobile refrigeration systems, are commonly used to transport perishable cargo, such as, for example, meat, poultry, dairy products, cut flowers, and other fresh or frozen products, by road, rail, sea, or intermodally. In the case or refrigerated trucks, a transport refrigeration system is mounted to the truck, typically behind the truck or on the roof of the truck for maintaining a controller temperature environment within the cargo box within the truck. In the case of refrigerated trailers, which are typically pulled behind a tractor vehicle, a transport refrigeration system is mounted to the trailer, typically to the front wall of the trailer for maintaining a controlled temperature environment within the cargo box of the trailer.

Conventionally, transport refrigeration systems used in connection with refrigerated trucks and refrigerated trailers include a transport refrigeration unit having a refrigerant compressor, a condenser with one or more associated condenser fans, an expansion device, and an evaporator, with one or more associated evaporator fans, which are connected via appropriate refrigerant lines in a closed refrigerant flow circuit. Air or an air/gas mixture is drawn from the interior volume of the cargo box by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo box.

During operation of the transport refrigeration system, particularly for tractor-trailer systems, hot air from cooling the prime mover of the engine of the tractor is expelled between the tractor and the trailer near the condenser air inlet of the transport refrigeration unit. In addition, hot air is similarly discharged from the bottom of the transportation refrigeration unit. The condenser of the transport refrigeration unit draws in a mixture of the ambient air and the discharged air from both the tractor engine and the trailer refrigeration unit and uses that air mixture to absorb heat from the refrigerant flowing through the condenser. The increased temperature of the discharged air reduces the efficiency of the condenser and therefore the transport refrigeration unit.

SUMMARY OF THE INVENTION

According to one embodiment of the invention, a transport refrigeration system is provided including a tractor vehicle having an engine and a trailer operably coupled to the tractor vehicle. A transport refrigeration unit is mounted to a front surface of the trailer adjacent the tractor vehicle. At least one shield is mounted to the tractor or the trailer and is configured to divert discharged hot air from a flow path towards a condenser air inlet of the transport refrigeration unit.

In addition to one or more of the features described above, or as an alternative, in further embodiments the at least one shield is configured to direct the discharged hot air towards a side of at least one of the tractor and trailer.

In addition to one or more of the features described above, or as an alternative, in further embodiments the at least one shield is a generally hollow duct.

In addition to one or more of the features described above, or as an alternative, in further embodiments shield is configured to form a generally hollow duct when coupled to at least one of the tractor and trailer.

In addition to one or more of the features described above, or as an alternative, in further embodiments wherein the at least one shield is fabricated from plastic.

In addition to one or more of the features described above, or as an alternative, in further embodiments the at least one shield is formed from sheet metal.

In addition to one or more of the features described above, or as an alternative, in further embodiments the at least one shield includes a first shield mounted to the tractor and configured to divert vehicle engine heat towards a side of the tractor.

In addition to one or more of the features described above, or as an alternative, in further embodiments the first shield is generally complementary to one or more components extending from the tractor towards the trailer.

In addition to one or more of the features described above, or as an alternative, in further embodiments the system additionally includes a second shield adjacent a base of the transport refrigeration unit. The second shield is configured to divert hot air discharged from the transport refrigeration unit towards a side of the trailer.

In addition to one or more of the features described above, or as an alternative, in further embodiments the first shield and the second shield have a generally similar contour.

In addition to one or more of the features described above, or as an alternative, in further embodiments the first shield and the second shield do not contact one another when the tractor and trailer are in a linear configuration.

In addition to one or more of the features described above, or as an alternative, in further embodiments the at least one shield includes a first shield mounted adjacent a base of the transport refrigeration unit and configured to divert hot air discharged from the transport refrigeration unit away from the condenser air inlet.

In addition to one or more of the features described above, or as an alternative, in further embodiments the first shield is generally complementary to one or more components extending from the trailer towards the tractor.

In addition to one or more of the features described above, or as an alternative, in further embodiments a second shield is mounted to the tractor and is configured to divert hot air discharged from the vehicle engine towards a side of the tractor.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
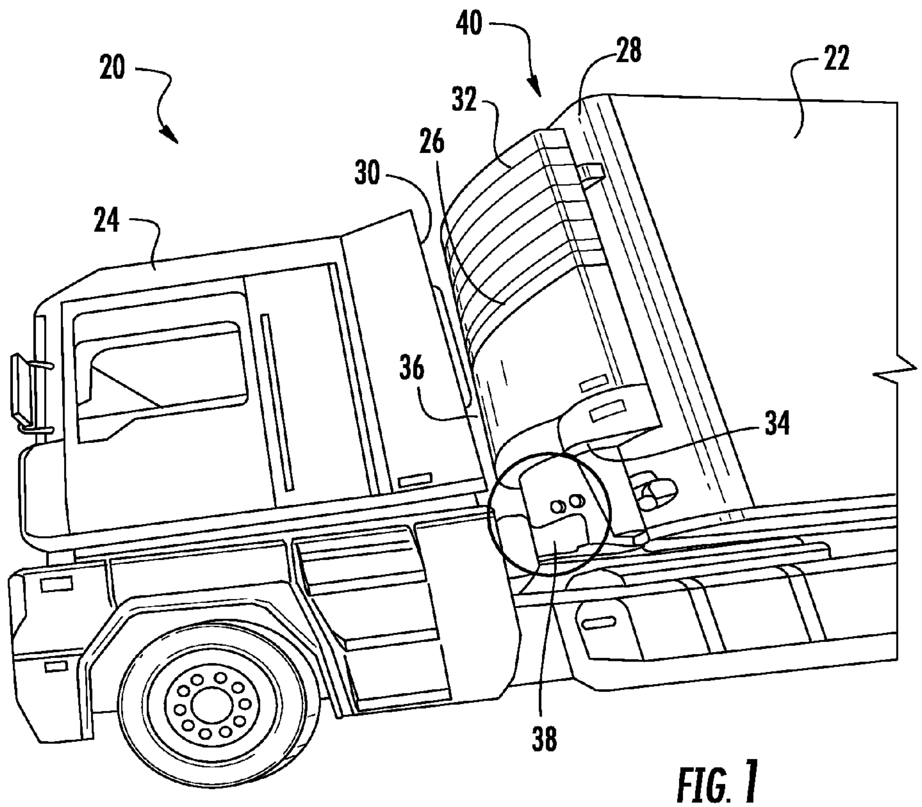
FIG. 1 is a perspective view of an example of a transport refrigeration system.

Referring now to FIG. 1, an example of a transport refrigeration system 20 is illustrated. In the illustrated, non-limiting embodiment, the transport refrigeration system 20 includes a trailer 22 towed or otherwise transported by a tractor 24. The system 20 includes a transport refrigeration unit 40 configured to cool a cargo space of the trailer 22. The transport refrigeration unit 40 is enclosed within an outer cover 26 and attached to a surface 28 of the trailer 22 adjacent the back 30 of the tractor 24. As is common for transport refrigeration systems 20, various panels or other portions of the outer cover 26 may be hinged and/or are removable to provide efficient access to the refrigeration unit 40 to perform routine maintenance.

The transport refrigeration unit 40 is typically powered by an engine (not shown), separate from the engine of the tractor 24, and located behind the lower panels of the transport refrigeration unit 40. The transport refrigeration unit 40 generally comprises a one-piece, self-contained refrigeration/heating unit including an engine, a compressor, a condenser, and an evaporator. In the illustrated, non-limiting embodiment, an air inlet for drawing in ambient air configured to cool the refrigerant or another heat transfer fluid as it flows through the condenser is provided by way of a grill 32 located at the upper portion of the cover 26. The air is configured to remove heat from one or more of the condenser, engine (not shown) and a radiator configured to cool the engine (not shown) in sequence, prior to being discharged from a base 34 of the refrigeration unit 40 (see FIG. 2) adjacent the air gap 36 between the tractor 24 and the trailer 22.

Operation of the tractor 24, more specifically an engine (not shown) thereof, results in generation of heated air from the vehicle engine that must be expelled into the ambient atmosphere outside the tractor 24. In tractor-trailer systems, air from an engine cooling system of the tractor 24 is blown between the tractor cabin 24 and the trailer 22 adjacent the bottom of the refrigeration unit 40. For clarity, this area where the heated air from both the transport refrigeration unit 40 and the engine is expelled is identified in FIGS. 1 and 2 by numeral 38.

Figure 2:
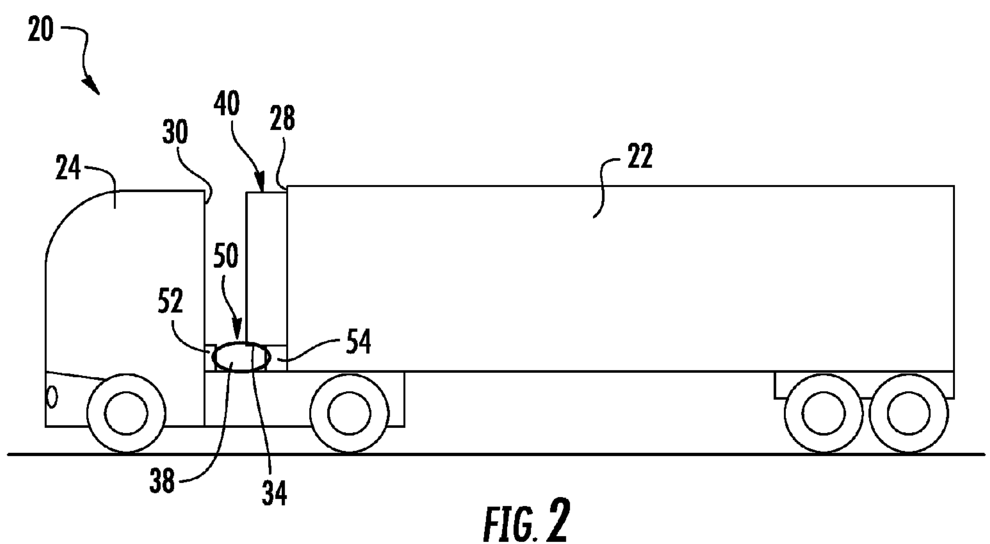
FIG. 2 is a side view of a transport refrigeration system according to an embodiment of the invention prior to a tractor-trailer turning operation.

Referring now to FIG. 2, one or more shields 50 are configured to divert the discharged hot air from the transport refrigeration unit 40 and/or the vehicle engine away from the air gap between the tractor 24 and the trailer 22. The one or more shields 50 may be formed from any suitable material, including, but not limited to sheet metal or plastic for example. The shields 50 themselves may be baffles or ducts, or alternatively, may be configured to form a duct when mounted to one of the tractor 24 and trailer 22. In one embodiment, the at least one shield 50 is configured to divert the heated air discharged from either the transport refrigeration unit 40 or the vehicle engine upwards or downwards and towards the sides of the tractor 24 and the trailer 22. As a result, the at least one shield 50, therefore prevents the warm or hot discharged air from being drawn into the condenser air inlet, thereby improving the operational efficiency of the refrigeration unit 40.

Figure 3:
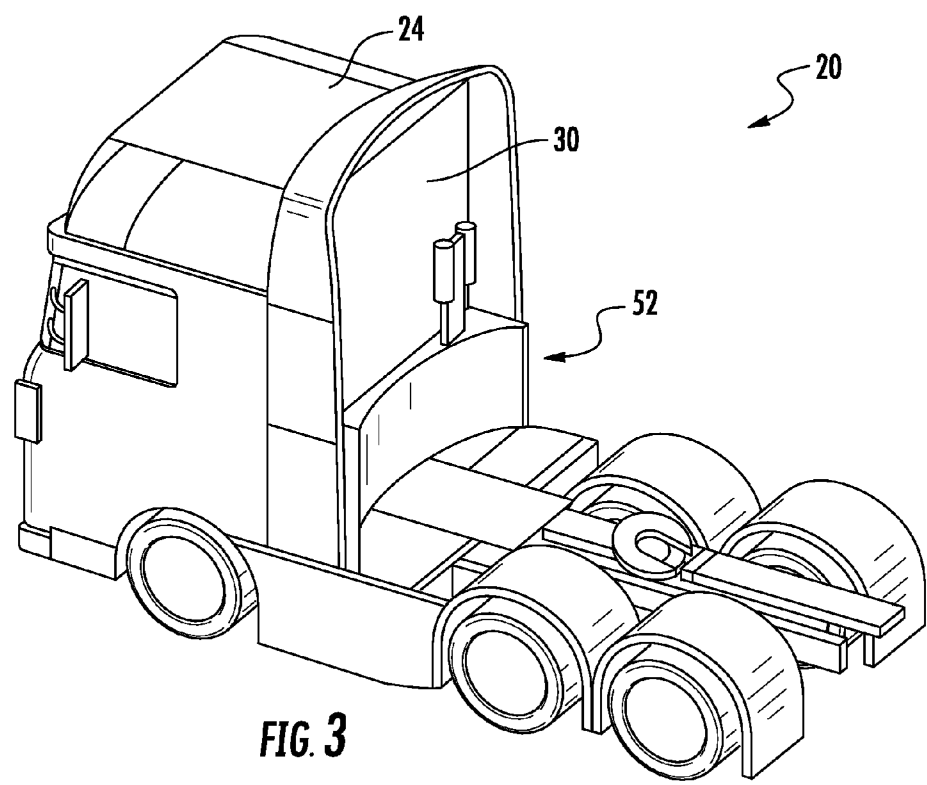
FIG. 3 is a perspective view of a heat shield mounted to the tractor of the transport refrigeration system according to an embodiment of the invention.
Figure 4:
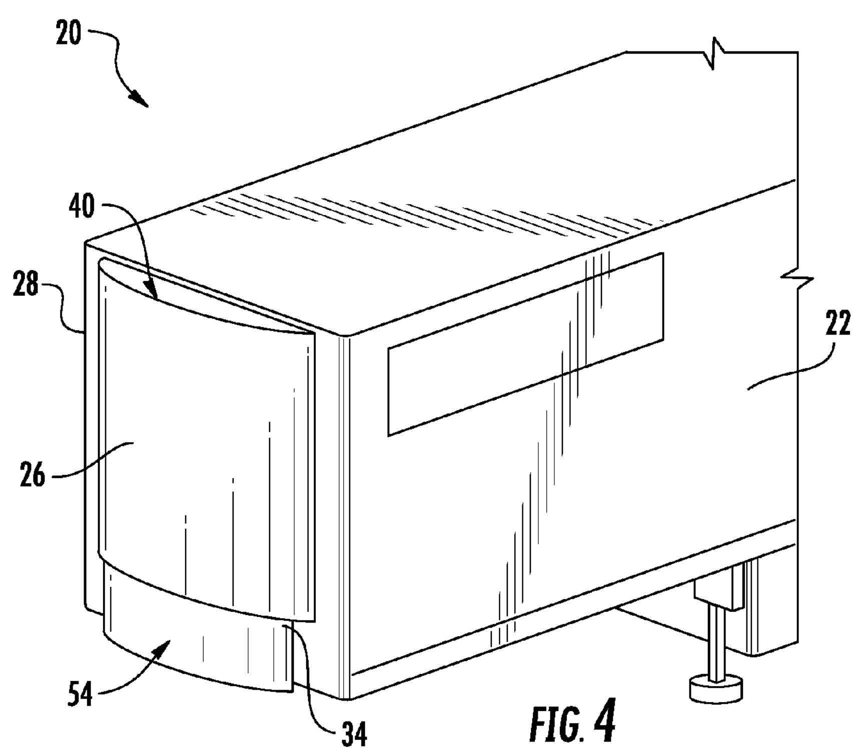
FIG. 4 is a perspective view of a heat shield mounted to the trailer of the transport refrigeration system according to an embodiment of the invention.

As illustrated in FIGS. 2-4, at least a portion of a first shield 52, such as a vehicle engine heat shield for example, may be mounted to the back surface 30 of the tractor 24 to prevent the discharged hot air from the vehicle engine from becoming entrained in the condenser air inlet via grill 32. Alternatively, or in addition, a portion of a second shield, such as a transport refrigeration unit shield 54, may be mounted to the front surface 28 of the trailer 22 to divert the hot air discharged from the transport refrigeration unit 40 away from becoming entrained in the condenser air inlet via grill 32. The shields 52, 54 may be configured to attach to the tractor 24 and the trailer 22, respectively, via any of a variety of known attachment means, for example a bracket and fasteners or a snap-fit connection. In one embodiment, one or both of shields 52, 54 are mounted to the system 20 in a way that does not interfere with the one or more conduits (not shown), such as brake hoses for example, connecting the tractor 24 and the trailer 22. Although the illustrated transport refrigeration system 20 includes both a first and second shield 52, 54, embodiments having only one of the first shield 52 and the second shield 54 are within the scope of the invention.

The shape and contour of each of the first and second shields 52, 54 is generally similar or complementary to any additional components extending from surface 30 of the tractor 24, or surface 28 of the trailer 22. In addition, the contour of the first shield 52 is generally similar or complementary to the contour of the second shield 54. In the illustrated, non-limiting embodiments of FIGS. 3 and 4, the first shield 52 has a generally concave curvature and the second shield 54 a generally convex curvature such that a portion of the second shield 54 could be received within a portion of the first shield 52. The first and second shield 52, 54 are not configured to contact one another during normal operation of the system 20, for example when the tractor 24 and trailer 22 are in a linear configuration. The contour of the shields 52, 54 may additionally be configured to avoid contact with one another when the system is in a second, non-linear configuration, such as when the tractor 24 is making a turn for example.

Inclusion of one or more shield 50 as described herein will deflect the streams of the hot air to the sides of the tractor 24 and/or trailer 22, so that they do not become entrained in the condenser air inlet. As a result, cooler ambient air will be drawn into the condenser, thereby improving not only the efficiency, and therefore the fuel consumption of the system 20, but also the reliability and the operability thereof.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A transport refrigeration system comprising:

a tractor vehicle having an engine;

a trailer operably coupled to the tractor vehicle;

a transport refrigeration unit mounted to a front surface of the trailer adjacent the tractor vehicle; and at least one shield mounted to the tractor or the trailer within an air gap defined between the tractor and the trailer, the at least one shield being configured to divert discharged hot air from a flow path towards a condenser air inlet of the transport refrigeration unit.

2. The transport refrigeration system according to claim 1, wherein the at least one shield is configured to direct the discharged hot air towards a side of at least one of the tractor and trailer.

3. The transport refrigeration system according to claim 1, wherein the at least one shield is a generally hollow duct.

4. The transport refrigeration system according to claim 1, wherein the at least one shield is configured to form a generally hollow duct when coupled to at least one of the tractor and trailer.

5. The transport refrigeration system according to claim 1, wherein the at least one shield is fabricated from plastic.

6. The transport refrigeration system according to claim 1, wherein the at least one shield is formed from sheet metal.

7. The transport refrigeration system according to claim 1, the at least one shield includes a first shield mounted to the tractor and configured to divert vehicle engine heat towards a side of the tractor.

8. The transport refrigeration system according to claim 1, wherein the at least one shield is generally complementary to one or more components extending from the tractor towards the trailer.

9. The transport refrigeration system according to claim 7, further comprising a second shield adjacent a base of the transport refrigeration unit and configured to divert hot air discharged from the transport refrigeration unit towards a side of the trailer.

10. The transport refrigeration system according to claim 9, wherein the first shield and the second shield have a generally similar contour.

11. The transport refrigeration system according to claim 9, wherein the first shield and the second shield do not contact one another when the tractor and trailer are in a linear configuration.

12. The transport refrigeration system according to claim 1, the at least one shield includes a first shield mounted adjacent a base of the transport refrigeration unit and configured to divert hot air discharged from the transport refrigeration unit away from the condenser air inlet.

13. The transport refrigeration system according to claim 12, wherein the first shield is generally complementary to one or more components extending from the trailer towards the tractor.

14. The transport refrigeration system according to claim 12, further comprising a second shield mounted to the tractor and configured to divert hot air discharged from the vehicle engine towards a side of the tractor.

* * * * *